United States Patent
Schulz

(10) Patent No.: US 7,822,420 B1
(45) Date of Patent: Oct. 26, 2010

(54) METHOD AND BASE STATION FOR ALLOCATING A CHANNEL REQUIRED FOR A RADIO TRANSMISSION

(75) Inventor: Egon Schulz, Munich (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/937,344

(22) PCT Filed: Mar. 22, 2000

(86) PCT No.: PCT/DE00/00885
§ 371 (c)(1),
(2), (4) Date: Feb. 14, 2002

(87) PCT Pub. No.: WO00/57660
PCT Pub. Date: Sep. 28, 2000

(30) Foreign Application Priority Data
Mar. 23, 1999 (DE) .................. 199 13 086

(51) Int. Cl.
*H04W 40/00* (2009.01)
*H04W 72/00* (2009.01)
*H04W 4/00* (2009.01)

(52) U.S. Cl. ............ 455/447; 455/452.1; 370/329

(58) Field of Classification Search .......... 455/447, 455/450–451, 452.1, 453, 509, 452.2, 513, 455/515, 561, 445; 370/320, 235, 329, 330, 370/328, 437, 431
See application file for complete search history.

(56) References Cited

U.S. PATENT DOCUMENTS

| | | | | |
|---|---|---|---|---|
| 5,448,750 A | | 9/1995 | Eriksson et al. | |
| 5,719,859 A | * | 2/1998 | Kobayashi et al. | 370/347 |
| 5,878,036 A | * | 3/1999 | Spartz et al. | 370/335 |
| 5,937,002 A | * | 8/1999 | Andersson et al. | 375/131 |
| 6,081,536 A | * | 6/2000 | Gorsuch et al. | 370/468 |
| 6,229,802 B1 | * | 5/2001 | Hippelainen | 370/349 |
| 6,317,418 B1 | * | 11/2001 | Raitola et al. | 370/278 |
| 6,377,540 B1 | * | 4/2002 | Hogberg et al. | 370/216 |
| 6,388,999 B1 | * | 5/2002 | Gorsuch et al. | 370/335 |
| 6,389,034 B1 | * | 5/2002 | Guo et al. | 370/441 |
| 6,480,554 B1 | * | 11/2002 | Toskala et al. | 375/340 |
| 6,498,790 B1 | * | 12/2002 | Shaheen et al. | 370/347 |
| 6,526,036 B1 | * | 2/2003 | Uchida et al. | 370/342 |
| 6,724,813 B1 | * | 4/2004 | Jamal et al. | 375/219 |
| 7,227,839 B2 | * | 6/2007 | Forssell et al. | 370/229 |

FOREIGN PATENT DOCUMENTS

| | | | |
|---|---|---|---|
| DE | 195 43 253 A1 | | 5/1996 |
| DE | 197 13 164 A1 | | 11/1997 |
| WO | WO 98/25359 | * | 6/1998 |
| WO | WO 99/49684 | | 9/1999 |

* cited by examiner

*Primary Examiner*—George Eng
*Assistant Examiner*—Brandon J Miller
(74) *Attorney, Agent, or Firm*—King & Spalding L.L.P.

(57) ABSTRACT

For a radio transmission between a subscriber station and a base station in accordance with a hybrid multiple access method (e.g. CDMA, FDMA, TDMA), unambiguous descriptions for the usable transmission resources in the uplink and downlink are proposed to obtain efficient utilization of resources in the access of symmetric and/or unsymmetric services, the channel description containing information on the order of channel utilization during the radio transmission.

7 Claims, 5 Drawing Sheets

Stand der Technik

Stand der Technik

| Unpaired Band | | | | Paired Band Uplink | | | | | | | | | | | |
|---|---|---|---|---|---|---|---|---|---|---|---|---|---|---|---|
| 1900 | | | | 1920 | | | | | | | | | | | 1980 |
| f1 | f2 | f3 | f4 | f5 | f6 | f7 | f8 | f9 | f10 | f11 | f12 | f13 | f14 | f15 | f16 |
| | | | | | | | | | | | | | | | |

| Unpaired Band | | | Paired Band Downlink | | | | | | | | | | |
|---|---|---|---|---|---|---|---|---|---|---|---|---|---|
| 2010 | | | 2110 | | | | | | | | | | 2170 |
| g1 | g2 | g3 | g5 | g6 | g7 | g8 | g9 | g10 | g11 | g12 | g13 | g14 | g15 | g16 |
| | | | | | | | | | | | | | | |

Fig. 2                              Stand der Technik

| Unpaired Band | | | | Paired Band Uplink | | | | | | | | | | | |
|---|---|---|---|---|---|---|---|---|---|---|---|---|---|---|---|
| 1900 | | | | 1920 | | | | | | | | | | | 1980 |
| f1 | f2 | f3 | f4 | f5 | f6 | f7 | f8 | f9 | f10 | f11 | f12 | f13 | f14 | f15 | f16 |
| T | T | T | T | F | T | F | F | T | F | F | F | F | T | F | T |

| Unpaired Band | | | Paired Band Downlink | | | | | | | | | | |
|---|---|---|---|---|---|---|---|---|---|---|---|---|---|
| 2010 | | | 2110 | | | | | | | | | | 2170 |
| g1 | g2 | g3 | g5 | g6 | g7 | g8 | g9 | g10 | g11 | g12 | g13 | g14 | g15 | g16 |
| T | T | T | F | F | F | F | F | F | F | F | F | F | F | F |

T    TDD-Modus
F    FDD-Modus

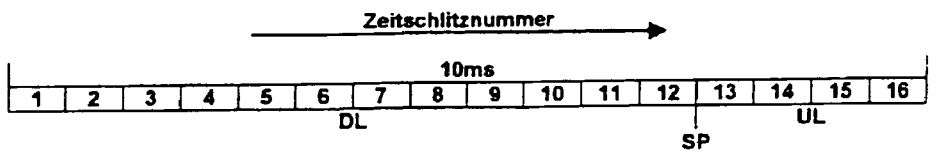
Fig. 4            Stand der Technik
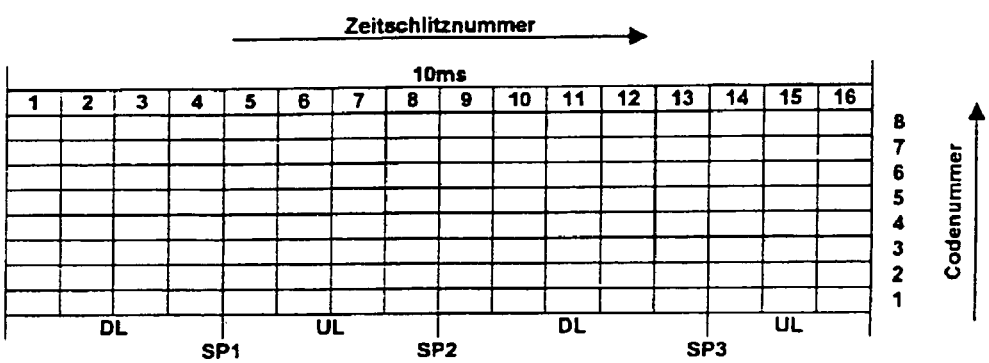
Fig. 5            Stand der Technik
| Bedeutung | Werte |
|---|---|
| Kanaltyp/ Unterkanal | 1-16 |
| Zeitschlitz | 1-16 |
| Codegruppe | 1-256 |
| Spreizcode | 1-16 |
| Mittambel | 1-16 |
| Frequenz | 1-256 |
Fig. 6
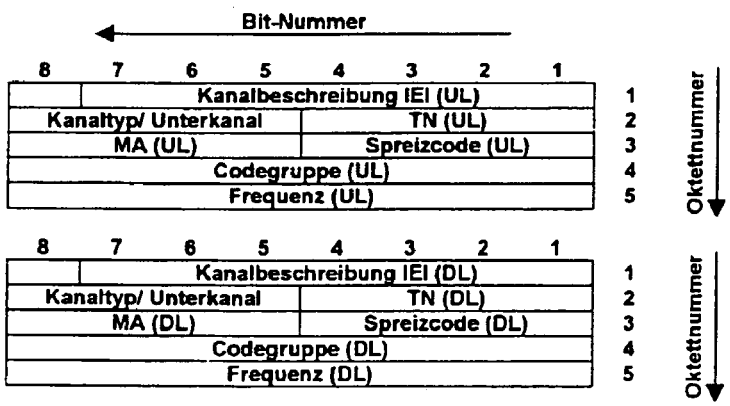
Fig. 7

| Bit-Nummer 8 7 6 5 4 3 2 1 | | Oktettnummer |
|---|---|---|
| Kanalbeschreibung IEI (UL) | | 1 |
| Kanaltyp/ Unterkanal | TN | 2 |
| MA | Spreizcode | 3 |
| Codegruppe | | 4 |
| Frequenz | | 5 |
| 2. Kanal | TN 2 | 6 |
| MA 2 | Spreizcode 2 | 7 |
| Codegruppe 2 | | 8 |
| Frequenz 2 | | 9 |
| 3. Kanal | TN 3 | 10 |
| MA 3 | Spreizcode 3 | 11 |
| Codegruppe 3 | | 12 |
| Frequenz 3 | | 13 |
| 4. Kanal | TN 4 | 14 |
| MA 4 | Spreizcode 4 | 15 |
| Codegruppe 4 | | 16 |
| Frequenz 4 | | 17 |

Fig. 11

| Bit-Nummer 8 7 6 5 4 3 2 1 | | Oktettnummer |
|---|---|---|
| Kanalbeschreibung IEI | | 1 |
| Kanaltyp/ Unterkanal | TN | 2 |
| MA | Spreizcode | 3 |
| Spreizcode 2 | Spreizcode 3 | 4 |
| Spreizcode 4 | frei | 5 |
| Codegruppe | | 6 |
| Frequenz | | 7 |

Fig. 12

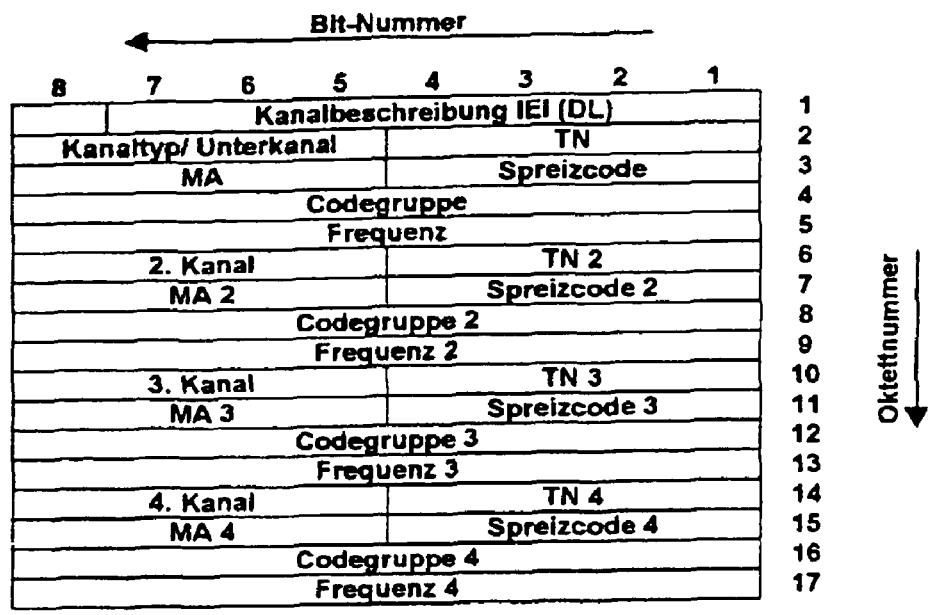
Fig. 13
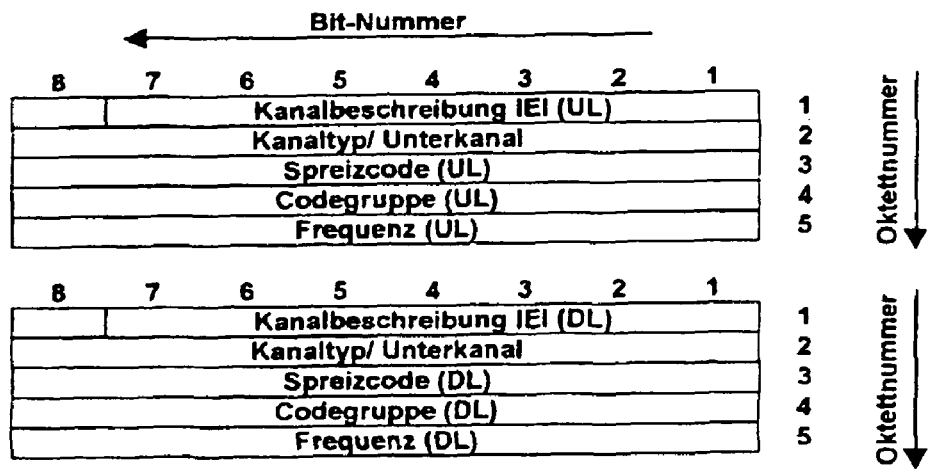
Fig. 14
Fig. 15

METHOD AND BASE STATION FOR ALLOCATING A CHANNEL REQUIRED FOR A RADIO TRANSMISSION

CLAIM FOR PRIORITY

This application is a U.S. national stage application of International Application No. PCT/DE00/00885 filed on Mar. 22, 2000, which designates the United States of America, and claims priority to German application number 199 13 086.8 filed Mar. 23, 1999, the contents of which are hereby incorporated by reference in their entirety.

TECHNICAL FIELD OF THE INVENTION

The invention relates to a method and a base station for assigning channels for radio transmission, and in particular, for assigning channels for radio transmission between a subscriber station and a base station in mobile radio systems.

BACKGROUND OF THE INVENTION

In a GSM system (Global System for Mobile Communications), a combination of frequency division multiple access (FDMA) and time division multiple access (TDMA) is used. The available frequency band is divided into an uplink band (890 MHz-915 MHz) and a downlink band (935 MHz-960 MHz) with a band spacing of 45 MHz when using a frequency division duplex (FDD) method. Each of these bands is subdivided into 124 individual frequency channels at a spacing of 200 kHz. Each frequency channel is unambiguously numbered and a pair of equal numbers from the uplink band and the downlink band forms one duplex channel with a fixed duplex spacing of 45 MHz. This is the FDMA component. Within each frequency channel, a TDMA method with 8 timeslots per timeslot frame is used, the timeslot frames of the uplink band being sent with three timeslots delay compared with the timeslot frames of the downlink band for reducing the switching effort. A subscriber station in each case uses the timeslot having the same timeslot number (TN) in the uplink band and in the downlink band. This correspondingly also applies to the expanded GSM frequency bands and for DCS (Digital Communication System) 1800.

In each timeslot of a timeslot frame, databursts of the same length are sent. A normal burst (NB) includes error-protection coded and encrypted user data, symmetrically separated by a so-called midamble (MA) for estimating the channel characteristics and corresponding channel equalization. The timeslot number, the midamble number and the channel type (control channel, traffic channel . . . ) apply both to the uplink band and to the downlink band in the GSM system.

In each timeslot of a timeslot frame, databursts of the same length are sent. A normal burst (NB) contains error-protection coded and encrypted user data, symmetrically separated by a so-called midamble (MA) for estimating the channel characteristics and corresponding channel equalization. The timeslot number, the midamble number and the channel type (control channel, traffic channel . . . ) apply both to the uplink band and to the downlink band in the GSM system.

This means that the logical or physical channel allocated to a subscriber station in a GSM system, is unambiguously specified in the uplink band and in the downlink band even without information on uplink or downlink, by means of a channel description.

If an optionally applicable frequency hopping is used during which the frequency is changed periodically during the transmission in order to compensate for frequency-selective disturbances, the frequency hopping parameters also apply to the uplink band and the downlink band.

In a DECT (Digital Enhanced Cordless Telephone) system which also uses a combination of FDMA and TDMA at the radio interface, the total available frequency band (between 1880 MHz and 1990 MHz) is used in both directions. In contrast to the GSM system, where transmission and reception takes place in different timeslots for separating uplink from downlink. This is called a TDD (time division duplex) mode. According to the DECT standard, the first 12 timeslots of a DECT frame are provided for the downlink and the second 12 timeslots of the DECT frame are provided for the uplink. There is always a spacing of 12 timeslots between uplink and downlink of a voice connection. These 12 timeslots correspond to a period of 5 ms because the DECT system operates with a fixed switching point between downlink and uplink. If a DECT subscriber station requests a voice channel (full slot) on a particular timeslot, for example timeslot 18, and on a particular frequency fx, the uplink channel is unambiguously specified in accordance with the DECT standard. The uplink channel is on the same frequency fx and on timeslot 6 (18-12).

Future radio communications systems such as UMTS (Universal Mobile Telecommunication System) which, among other things, will offer a transmission capacity comparable to ISDN for services, such as video telephony and broadband connections, and will be used in the text which follows for representing the technical background of the invention without restricting the general applicability of the use of the invention, are based on the transmission channels being separated by spread-spectrum codes. The significant feature of a code division multiple access (CDMA) method is the transmission of a narrow-band radio signal in a wide frequency spectrum, the narrow-band signal being spread to a wideband signal by means of a suitable coding rule. In the UMTS system, two modes are provided, the FDD mode and the TDD mode. The FDD mode is a broadband CDMA characterized by the degrees of freedom of frequency and spread-spectrum code and the TDD mode is a TD/CDMA method characterized by the degrees of freedom of frequency, timeslot and spread-spectrum code. In the latter, the multiple access is achieved by means of a broadband TDMA/FDMA system in which a multiple access according to the CDMA method is allowed in certain timeslots of a timeslot frame. In the TDD mode, one or more variable switching points between uplink and downlink are provided within a timeslot frame, in order to achieve better management of the scarce frequency resources.

In the UMTS system, different frequency bands are provided, unpaired bands and paired bands. From current perspective, the unpaired bands are reserved for the TDD mode and the paired bands are exclusively reserved for the FDD mode. One unpaired band is in the frequency range of 1900 MHz to 1920 MHz and the other unpaired band is in the frequency range of 2010 MHz to 2025 MHz. The uplink band of the paired band is in the frequency range of 1920 MHz to 1980 MHz and the downlink band of the paired band is in the range of 2110 MHz to 2170 MHz. The duplex band thus has a duplex spacing of 190 MHz. The frequency bands are divided into frequencies of 5-MHz bandwidth each. The unpaired bands thus have four and three frequencies and the paired band has 12 uplink frequencies and 12 downlink frequencies. FIG. 3 provides a representation of the frequency bands and how they are divided up.

When symmetric services are requested such as, for example, services with data rates of 64 kBit/s, 144 kbit/s or higher (real-time service) or also voice services, the same data rates must be transmitted in the downlink band as in the uplink band.

In the case of asymmetric utilization of the paired band, the downlink band is heavily loaded and the uplink band is loaded only slightly. This can be expected, in particular, in the case of database enquiries such as from the Internet. In the case of asymmetric data services, it is assumed that a high data rate is required in the downlink and a low data rate in the uplink. Naturally, the situation can also occur the other way around, for example when sending a fax from a subscriber station.

For this purpose, it has been proposed to allow a TDD mode in the uplink band of the paired band from the UMTS as a result of which a higher capacity utilization of the frequency resources is supposed to be achievable overall. This requires a new protocol for an unambiguous channel description which must be implemented both in the subscriber stations and in the base stations.

The invention performs an efficient description of the channels with little signaling expenditure.

SUMMARY OF THE INVENTION

BRIEF DESCRIPTION OF THE DRAWINGS

In the text which follows, the invention will be explained in detail with reference to exemplary embodiments of the UMTS system and the associated drawing, in which:

FIG. 2 shows a representation of the frequency bands in the UMTS system.

FIG. 4 shows a timeslot frame with a variable switching point between uplink and downlink.

FIG. 5 shows a timeslot frame with a number of switching points and CDMA multiple access.

FIG. 6 shows parameters of a channel description without using a frequency hopping method in the TDD mode of UMTS.

FIG. 7 shows a general representation of a channel description according to FIG. 6 by means of two information elements within a system information item.

FIG. 11 shows a general channel description for an uplink channel.

FIG. 12 shows a shortened channel description according to FIG. 11 for channels which differ in their spread-spectrum code.

FIG. 13 shows a general channel description for a downlink channel.

FIG. 14 shows parameters for a channel description in the FDD mode of UMTS.

FIG. 15 shows a variant of a channel description by means of two information elements for each channel in the FDD mode of UMTS.

DETAILED DESCRIPTION OF THE PREFERRED EMBODIMENT

Figures 1, 3:
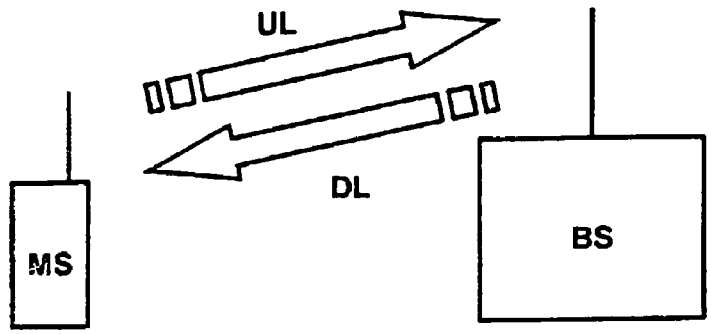
FIG. 1 shows a general representation of a radio interface in a radio communications system.
FIG. 3 shows an exemplary frequency band distribution in the paired band.

This object is achieved by means of the method according to claim 1 and the base station according to claim 7. Advantageous embodiments and developments of the invention are the subject matter of the dependent claims.

In one embodiment of the invention, there is a method for assigning channels for a radio transmission between a subscriber station and a base station of a radio communications system provides a number of channel resources are unambiguously assigned to the subscriber station by means of a common channel description transmitted to it for the radio transmission and the channel description contains information on the order of utilization of the channel resources during the radio transmission.

According to another embodiment of the invention, the order of the utilization of the channel resources is specified by the order of the information of the individual channel resources within the channel description.

On the one hand, the fixed duplex spacing between the uplink band and the downlink band in the FDD mode is cancelled by dividing the paired band into FDD and TDD. On the other hand, any fixed allocation of the timeslots to downlink and uplink within a timeslot frame is cancelled with respect to a simultaneous support of symmetric and asymmetric services in the TDD mode. Hence, the position and spacing of the downlink channel and the uplink channel are unambiguously defined in a channel description for a channel assignment, independently of the transmission resource used.

For this purpose, the uplink channel and downlink channel are described one after the other in a common information element and sent from the base station to a subscriber station in a system information in the dedicated control channel (DCCH) in an embodiment of the invention. According to a further embodiment, two information elements are set up for the uplink channel and the downlink channel and are transmitted separately. According to a further embodiment, a channel assignment is carried out by describing one channel when, for example, the uplink and the downlink channel differ in the timeslot number and all other parameters are identical. According to a further embodiment, both channels are described in a common information element and a flag indicates what applies to the uplink channel and what applies to the downlink channel. This corresponds to a new transmission parameter UL/DL within the system information message. A further channel description according to the invention is organized in such a manner that one information element describes the uplink channel whereas the downlink channel is described by a new transmission parameter. With regard to multicarrier multifrequency mobile radio systems, the frequency spacings between uplink channel and downlink channel are specified in an information element in a further embodiment. In a case where, for example, more than one physical channel is to be provided to the user for the purpose of real-time data transmission in one direction, the order in which the channels are to be used is unambiguously specified in the channel description in a further embodiment. In a scaling down of this proposal, the order of channel utilization can be given by specifying the relevant spread-spectrum code or also by specifying the frequency.

In the case of a channel change, either the downlink channel or the uplink channel can be changed which is why, according to the invention, a channel description is provided for the downlink channel or for the uplink channel in these cases, and not for both directions at the same time.

According to the invention, the channel description for FDD and TDD can also be combined, for example a channel description for the uplink channel in the FDD mode with a channel description for the downlink in the TDD mode.

In a UMTS mobile radio network used as an example of a radio communications system, a subscriber station MS and a higher-level base station MS, which is to be used as an example of a station of a radio cell, of a sector of a radio cell or of a network itself, communicate, according to FIG. 1, via a radio interface downlink DL and uplink UL, either in the TDD mode or in the FDD mode of UMTS. The base station BS can set up a connection to another subscriber station MS, for example a mobile station or any other mobile or stationary terminal via a further radio interface (not shown).

FIG. 3 shows exemplary band partitioning for a frequency band according to FIG. 2 (prior art). According to this, five frequencies of the uplink paired band have been released for TDD instead of FDD, namely frequencies f6, f9, f10, f14 and f15. Whereas the maximum possible data rate is retained for the downlink in the FDD mode, it is reduced for the uplink. This has no noticeable consequences in the case of asymmetric utilization of data services in the FDD mode which frequently demand a higher bit rate for the downlink than for the uplink, for example during a data transfer from the Internet. In this case, 12 frequencies are now provided for the utilization of TDD, instead of 7 frequencies, in this time, which means that the available frequency band can be better utilized overall.

However, partitioning of the channels in FDD and TDD eliminates the fixed duplex spacing of the FDD channels in the paired band between uplink and downlink, which is why the frequency spacing of a downlink channel and an uplink channel must be specified in the case of an assignment. Similarly, specification is necessary in the TDD mode with regard to the simultaneous support of symmetric and asymmetric services.

The TDD mode operates with a timeslot structure, one timeslot frame with a frame period of 10 ms being subdivided into 16 timeslots. In each of the timeslots, the subscribers are distinguished by different spread-spectrum codes (CDMA components). In TDD mode, 16 spread-spectrum codes are provided.

An advantage of the TDD mode is the variable switching point between downlink and uplink within a timeslot frame. The variable switching points make it possible to use the available resources more efficiently for asymmetric services. For example, the switching point can be adjusted in such a manner that 12 timeslots of the timeslot frame are available for the downlink DL and the remaining 4 timeslots are available for the uplink UL (FIG. 4). Subtracting two timeslots for control channels, a total of 14 timeslots would thus still be available for traffic channels, 11 timeslots of which could be allocated to the downlink and 3 timeslots to the uplink. In this case, the TDD mode can support higher data rates in the downlink direction than in the uplink direction. The switching point SP can be adjusted by the network by "operations and maintenance" or also automatically varied in accordance with the current traffic volume.

It is also possible to provide a number of switching points within a timeslot frame. FIG. 5 shows 3 switching points SP1, SP2, SP3. In addition, it shows that each timeslot ts supports 16 channels which can be distinguished by different spread-spectrum codes 1 to 16. The flexibility of the switching points eliminates any rigid relationship between the timeslots ts such as it exists, for example, in the DECT system.

A system with 3 switching points within a timeslot frame according to FIG. 5 will now be considered. If the uplink timeslot 15 is allocated to a subscriber station MS for a voice link, the downlink timeslot can be allocated to the subscriber station MS either from the range of timeslot 1 to 4 or from the range of timeslot 9 to 13. These timeslots ts are either less than 8 timeslots or more than 8 timeslots away from timeslot 15, 8 timeslots corresponding to a period of 5 ms, i.e. one half of the frame period of a 10-ms timeslot frame. This means that, with a variable switching point SP, the uplink channel and the downlink channel are unambiguously specified during the channel assignment.

In FIG. 6, the parameters for a channel description in the TDD mode of UMTS without frequency hopping are designated. A specific physical channel can be accurately defined with values for the type of the logical channel/subchannel, for the timeslot number TN, for the code group, for the spread-spectrum code, for the midamble MA and for the frequency f.

If a frequency hopping method is used, the frequency list, the hop sequence number and the Mobile Allocation Index Offset (MAIO) are specified in the channel description. Furthermore, the possibility exists that the parameters for uplink and for downlink are also differentiated.

The actual parameters of a channel description in the case of the request for a voice channel are, for example:

| | | |
|---|---|---|
| Uplink: | Channel type: | full-slot traffic channel, voice |
| | Timeslot: | 15 |
| | Code group: | 5 |
| | Spread-spectrum code: | 10 |
| | Midamble: | 7 |
| | Frequency: | 3 |
| Downlink: | Channel type: | full-slot traffic channel, voice |
| | Timeslot: | 10 |
| | Code group: | 5 |
| | Spread-spectrum code: | 10 |
| | Midamble: | 7 |
| | Frequency: | 3 |

In a first embodiment of the invention, the uplink channel and the downlink channel are described one after the other in two separate optional information elements IEI, and transmitted from the base station to a subscriber station in an information item in the dedicated control channel (DCCH).

A channel description for the uplink channel UL is performed in a first information element IEI and a channel description for the downlink channel DL is performed in a second information element IEI.

FIG. 7 reproduces the identical format of the information elements IEI (UL) and IEI (DL) in structured form as part of a message of the DCCH. A message is a block of coherent data built up of a number of bits. 8 bits are in each case combined to form one octet. Octets thus form the elements from which a message is built up.

In the first octet, bits 1 to 7 include the message type, namely: information elements IEI for the separate channel description in the uplink UL and in the downlink DL, respectively. Bit 8 is free. In the second octet, bits 1 to 4 specify the timeslot number TN in the uplink UL and the downlink DL, respectively, bits 5 to 8 specify the channel type which, as already mentioned, can be the same in the uplink UL and downlink DL. In the third octet, bits 1 to 4 specify the spread-spectrum code and bits 5 to 8 specify the midamble number MA, in the uplink UL and downlink DL in each case. In the fourth octet, bits 1 to 8 are set for identifying the code group in the uplink UL and downlink DL, respectively, and the bits in the fifth octet designate the frequency of the channels in the uplink UL and the downlink DL. Each channel is thus unambiguously characterized.

Figure 8:
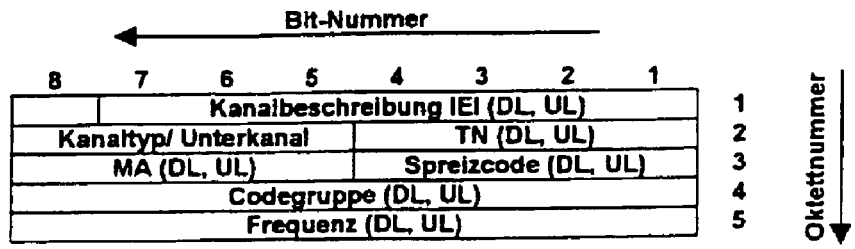
FIG. 8 shows a variant of the channel description with a common information element for both channel directions.

In a case where an uplink channel and a downlink channel differ, for example, by a timeslot number, a channel description can also be implemented by one information element IEI (DL_UL). The information element IEI (DL_UL) then specifies that downlink DL and uplink UL differ by 8 timeslots TN and the parameters of the downlink DL and uplink UL are otherwise identical. Such an information element IEI (DL_UL) is shown in FIG. 8.

Figure 9:
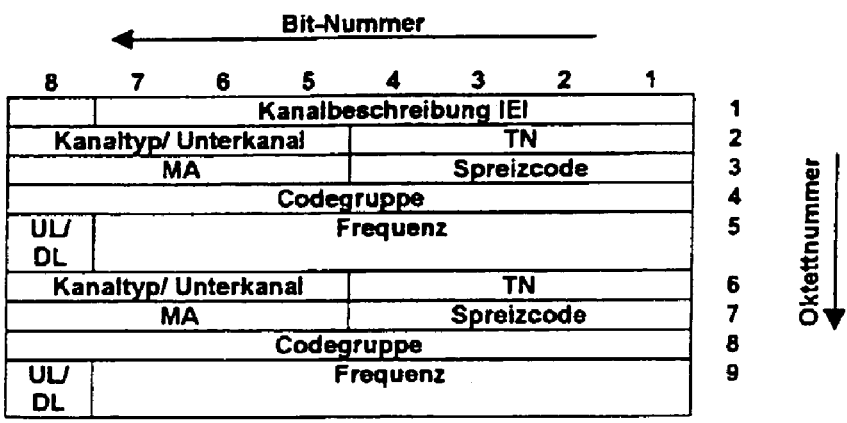
FIG. 9 shows a further variant of the channel description with only one information element and with a flag being set.

Another solution includes one information element IEI added to the channel description and flags in bit 8 in the 5th and 9th octet mark which description applies to the uplink channel UL and which applies to the downlink channel DL. FIG. 9 shows an example of this.

Figure 10:
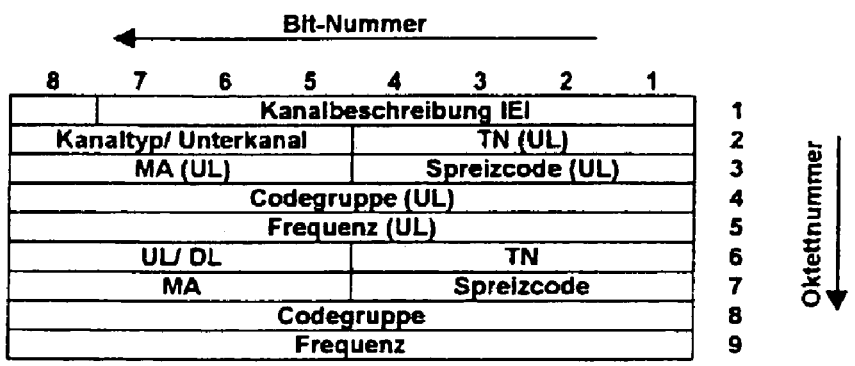
FIG. 10 shows a further variant of a channel description with one information element with fixed reference to uplink and downlink.

In a further embodiment, the first channel description, for example, relates to the uplink channel UL and other parameters describe the downlink channel DL. The information element IEI according to FIG. 10 specifies such a channel description.

In the case of a multicarrier base station and a multicarrier subscriber station, the frequencies for uplink UL and downlink DL can also be different, for example:

| Uplink: | Channel type: | full-slot traffic channel, voice |
| --- | --- | --- |
| | Timeslot: | 15 |
| | Code group: | 3 |
| | Spread-spectrum code: | 10 |
| | Midamble: | 7 |
| | Frequency: | 5 |
| Downlink: | Channel type: | full-slot traffic channel, voice |
| | Timeslot: | 10 |
| | Code group: | 3 |
| | Spread-spectrum code: | 7 |
| | Midamble: | 4 |
| | Frequency: | 3 |

Apart from voice services, there are also data services which can have a higher or lower rate. In the case of a real-time service, the same number of resources are provided for the uplink channel and the downlink channel. In the case of a 144-kbit/s real time service, 4 channels are needed in each direction. All channels can have almost the same parameters with the exception of the spread-spectrum code. Naturally, a number of parameters can also be different.

The appearance of a general representation of a channel description for the uplink channel UL for a 144-kbit/s real-time service could correspond, for example, to an information element IEI (UL) according to FIG. 11. It should be noted that the order in which channels 1 to 4 are to be used is unambiguously specified in the channel description if more than one physical channel is provided in one direction.

A shortened channel description may also be specified, according to FIG. 12, with an information element IEI (UL) if the 4 uplink channels differ in the spread-spectrum code and, the order of channel use is governed by this spread-spectrum code information. The order also specifies the order in which the data are transmitted. This information is significant, in particular, in the case of data with higher bit rates. There is a so-called priority list.

For the associated downlink channel DL, in contrast, the channel description could be of a general nature. An example of this is shown by the information element IEI (DL) according to FIG. 13.

As has already been explained, not all uplink frequency channels and downlink frequency channels have a fixed duplex spacing from one another any longer due to the utilization of TDD in the paired band. For this reason, the uplink channel UL and downlink channel DL are also determined unambiguously in a channel description in the FDD mode in a further embodiment of the invention. As in the TDD mode, information elements can be additionally set up for each frequency channel, for example, or the description of one frequency channel is included in the description of the other frequency channel, Naturally, reversions to other variants already specified are also possible, for example to the use of a flag.

An example of this is given below:

| Uplink: | Channel type: | Voice/data (service 1, service 2 etc.) |
| --- | --- | --- |
| | Spread-spectrum code: | 10 |
| | Code group: | 10 |
| | Frequency: | 3 |
| Downlink: | Channel type: | Voice/data (service 1, service 2 etc.) |
| | Spread-spectrum code: | 10 |
| | Code group: | 11 |
| | Frequency: | 5 |

A channel in the FDD mode is characterized as specific physical channel, according to FIG. 14, via the following parameters: type of logical channel/subchannel, code group, spread-spectrum code and frequency. The information elements for an uplink channel IEI (UL) and a downlink channel IEI (DL) are specified in FIG. 15 by way of example.

According to a further variant, the channel description for the FDD channels can also be combined in a single information element IEI:

| Uplink: | Channel type: | Voice/data (service 1, service 2 etc.) |
| --- | --- | --- |
| | Spread-spectrum code: | 10 |
| | Code group: | 10 |
| | Frequency: | 3 |
| Downlink: | Channel type: | Voice/data (service 1, service 2 etc.) |
| | Spread-spectrum code: | 10 |
| | Code group: | 11 |
| | Frequency: | 5 |

The information elements IEI for FDD and TDD and uplink and downlink can be different.

What is claimed is:

1. A method for assigning channels for radio transmission between a single subscriber station and a base station of a radio communications system, comprising:
for transmission of data in a predefined direction:
assigning a plurality of physical channels to the single subscriber station for the predefined transmission direction via a common channel description, the plurality of physical channels each having at least one of different spread-spectrum codes, different code groups, different frequencies and different midambles; and wherein
the common channel description comprises information about utilization of the plurality of physical channels by the single subscriber station during the radio transmission, which specifies an order of the transmission of data for the predefined transmission direction;

transmitting the common channel description to the subscriber station, in which an order of the utilization of the physical channels is specified by an order of the information on each of the plurality of physical channels within the channel description.

2. The method as claimed in claim 1, in which the order of the utilization of the physical channels is specified by information relating to at least one of timeslots assigned, to spread-spectrum codes and to assigned frequencies.

3. The method as claimed in claim 1, further comprising: sending a coherent channel description as a message from the base station to the single subscriber station, wherein an uplink channel and a downlink channel are described one after the other.

4. The method as claimed in claim 1, further comprising: sending an uplink channel and a downlink channel as separate messages from the base station to the single subscriber station.

5. The method as claimed in claim 1, further comprising: sending an uplink channel and a downlink channel in a common channel description as a message, the message having a flag indicating parts of the description which relate to the uplink channel and to the downlink channel.

6. The method as claimed in claim 1 wherein in a case where one channel is changed, the description of this channel is sent.

7. A base station for a radio communications system comprising:

a facility to assign channels for a radio transmission with one subscriber station for one transmission direction, wherein the facility is operable to generate and transmit a common channel description to the one subscriber station, wherein the common channel description comprises data assigning a plurality of physical channels for the radio transmission, the physical channels having at least one of different spread-spectrum codes, different code groups, different frequencies and different midambles, and wherein the common channel description further comprises information about utilization of the plurality of physical channels by the one subscriber station during the radio transmission, which specifies an order of transmission of data for the predefined-transmission direction, in which an order of the utilization of the physical channels is specified by an order of the information on each of the plurality of physical channels within the channel description.

* * * * *